United States Patent [19]

Thompson

[11] Patent Number: 4,669,816
[45] Date of Patent: Jun. 2, 1987

[54] OPTICAL WAVEGUIDE COUPLER

[75] Inventor: George H. B. Thompson, Sawbridgeworth, England

[73] Assignee: Standard Telephones and Cables Public Limited Company, London, England

[21] Appl. No.: 675,552

[22] Filed: Nov. 28, 1984

[30] Foreign Application Priority Data

Jan. 5, 1984 [GB] United Kingdom ............... 8400141

[51] Int. Cl.⁴ .............................................. G02B 6/26
[52] U.S. Cl. .............................. 350/96.15; 350/96.10; 350/96.20
[58] Field of Search ............... 350/96.10, 96.15, 96.16, 350/96.20, 96.21, 96.12, 96.30

[56] References Cited

U.S. PATENT DOCUMENTS

| | | | |
|---|---|---|---|
| 3,589,794 | 6/1971 | Marcatili | 350/160 |
| 3,936,144 | 2/1976 | Caton | 350/96.15 |
| 3,957,341 | 5/1976 | Taylor | 350/96.15 |
| 4,002,896 | 1/1977 | Davies et al. | 350/96.15 |
| 4,054,363 | 10/1977 | Suematsu | 350/96.15 X |
| 4,159,418 | 6/1979 | Marom | 350/96.15 |
| 4,359,260 | 11/1982 | Reinhart et al. | 350/96.12 |
| 4,518,219 | 5/1985 | Leonberger et al. | 350/96.18 X |
| 4,556,279 | 12/1985 | Shaw et al. | 350/96.16 X |
| 4,582,390 | 4/1986 | Furuya | 350/96.12 |

FOREIGN PATENT DOCUMENTS

0081296 9/1982 European Pat. Off. .

OTHER PUBLICATIONS

Pat. Abstracts of Japan, vol. 4, No. 118, 22nd Aug. 1980, p. 125 P24 (P-24) (600); and JP-A-55-74504, Nippon Denshin Denwa Kosha 05-06-1980.
Applied Physics Letters, vol. 41, No. 2, Jul. 1982, NY, USA, K. P. Jackson et al, "Microbend Optical Fiber Tapped Delay Line for Gigahertz Signal Processing", pp. 139-141.

*Primary Examiner*—William L. Sikes
*Assistant Examiner*—Akm E. Ullah
*Attorney, Agent, or Firm*—Kerkam, Stowell Kondracki & Clarke

[57] ABSTRACT

A single mode optical waveguide directional coupler is provided with enhanced wavelength selectivity by dividing the coupling region up into a number of identical sections (12) between which are interposed a set of identical decoupled sections (13) over which the two waveguides (10, 11) of the coupler are not optically coupled and have different optical path lengths.

12 Claims, 6 Drawing Figures

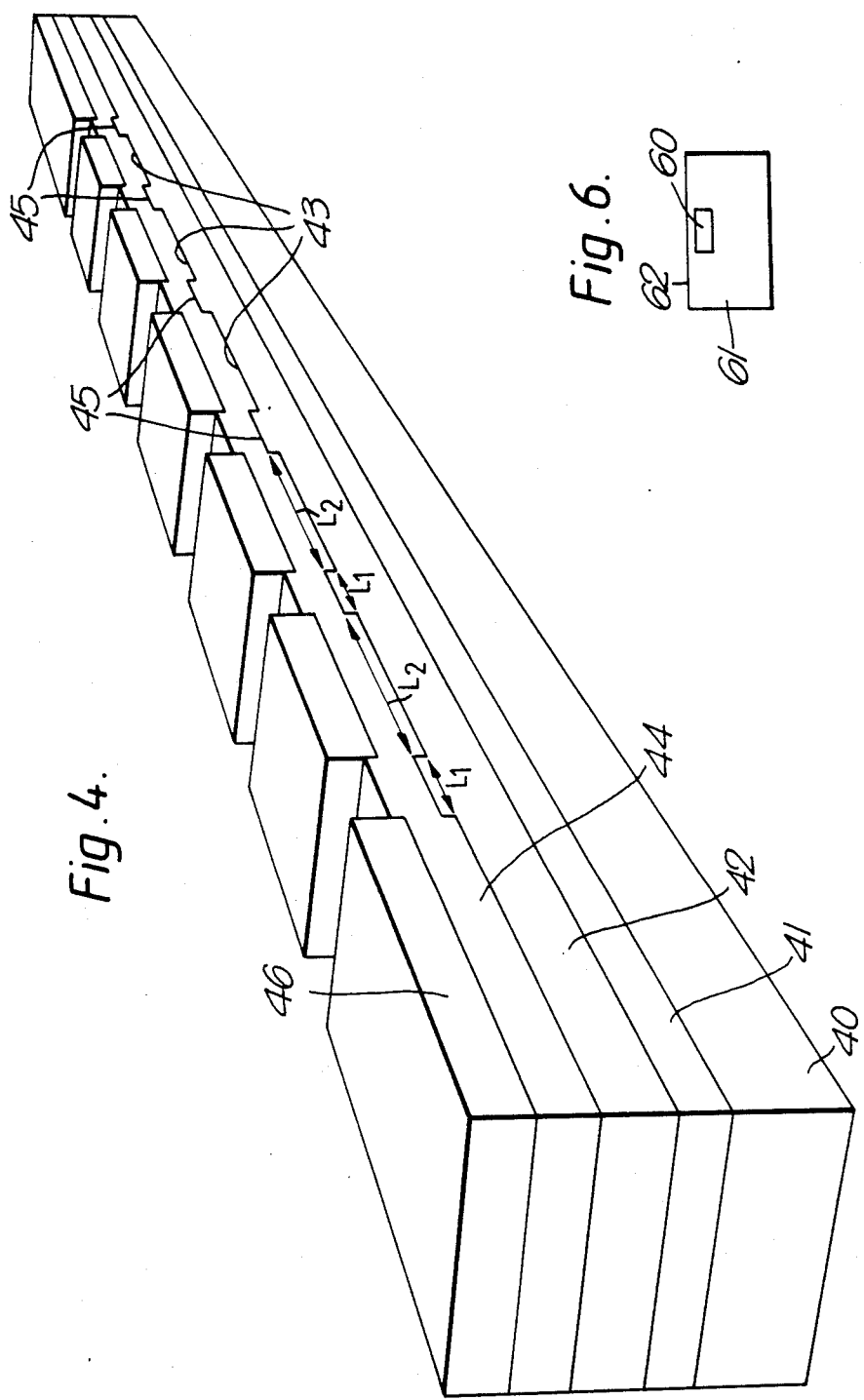

OPTICAL WAVEGUIDE COUPLER

BACKGROUND OF THE INVENTION

This invention relates to optical waveguide couplers and in particular to wavelength selective optical waveguide couplers.

It is known that, if two single mode optical waveguides dimensioned to provide matching propagation constants are arranged to extend alongside each other in sufficiently close proximity for their evanescent fields to overlap to an appreciable extent, then optical power will be coupled between the two waveguides. Power launched into one of the waveguides will, after a certain distance, be transferred in a single transfer substantially completely to the other. At twice this distance, the power is transferred back to the first waveguide. At three times this distance the power has been transferred for a second time to the second waveguide, and so on. The distance required for a single transfer of power from one waveguide to another is not completely independent of wavelength, but is such a weak function of wavelength as to make the resulting coupler substantially wavelength independent for most practical purposes in optical telecommunications application.

SUMMARY OF THE INVENTION

Accordingly, it is a general object of the invention to provide an optical waveguide coupler with enhanced wavelength selectivity.

In pursuance of this object an optical waveguide coupler is disclosed which possesses a modified structure which provides a much stronger wavelength dependence by breaking up the coupler into a set of coupling regions interspersed with a set of decoupled regions.

According to the present invention there is provided a wavelength selective optical waveguide coupler in which first and second single mode optical waveguides are provided with a set of identical coupling regions interspersed with a set of identical decoupled regions, wherein in each of the coupling regions the waveguides are dimensioned to provide matching propagation constants and extend alongside each other in sufficiently close proximity for their evanescent fields to overlap to the extent necessary to produce the required optical coupling, wherein in each of the decoupled regions the two waveguides have different optical path lengths, and wherein the aggregate length of the coupling regions is such that, for at least one wavelength for which the optical path difference of each of the intervening decoupled regions produces a relative phase shift between the two waveguides of an integral number of $2\pi$ radians, the coupling regions co-operate to provide a substantially complete transfer of optical power from either one of the waveguides to the other.

BRIEF DESCRIPTION OF THE DRAWINGS

The above-mentioned and other features of the invention will become more apparent by reference to the following description of two couplers embodying the invention in preferred forms. This description refers to the accompanying drawings in which:

FIG. 4 is a schematic representation of a longitudinal section through one form of coupler, FIG. 6 is a schematic cross-sectional representation of an alternative form of fibre waveguide for the coupler of FIG. 5.

DETAILED DESCRIPTION OF THE PREFERRED EMBODIMENTS

Figure 1:
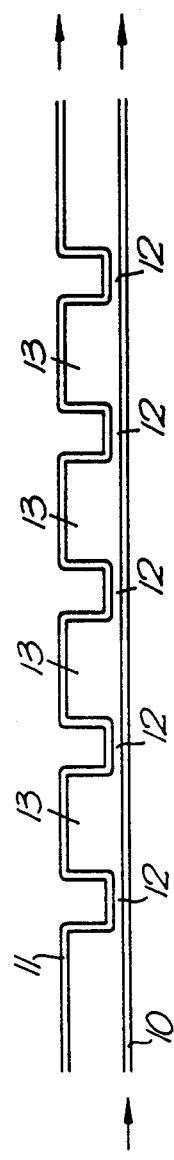
FIG. 1 is a schematic representation of the coupler.

In FIG. 1 a pair of optical waveguides are represented at 10 and 11. The two waveguides are optically coupled in a specific number, M, of identical coupling regions 12, which are interspersed with (M−1) decoupled regions 13. In the case of FIG. 1, M=5.

In each of the coupling regions 12 the optical propagation constants of the two waveguides are matched, and also they are sufficiently closely spaced for their evanescent fields to overlap to an appreciable extent. Therefore, the waveguides are optically coupled in these regions.

In the intervening decoupled regions there is required to be substantially no optical coupling between the waveguides. This can be achieved by ensuring that they are sufficiently widely separated to prevent their evanescent fields from overlapping to any appreciable extent, or by modifying the waveguide configurations so as to make the optical propagation constants of one of them significantly different from those of the other, or by a combination of these two techniques. Furthermore, within each decoupled region 13 the optical path distance of one waveguide is arranged to be different from that of the other so as to introduce a relative phase shift of $(2n\pi\delta)$, where n is an integer.

Figure 3:
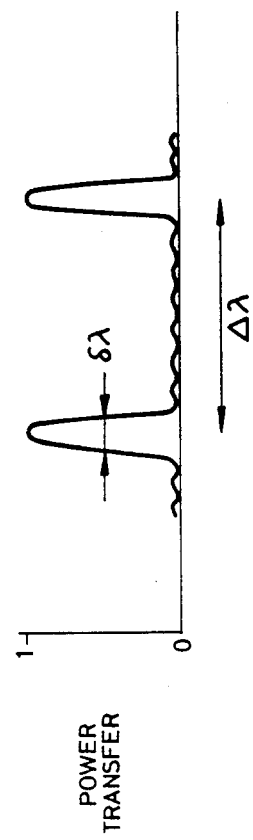
FIG. 3 shows the general shape of part of the spectral characteristic of a coupler incorporating several decoupled sections.
Figure 2:
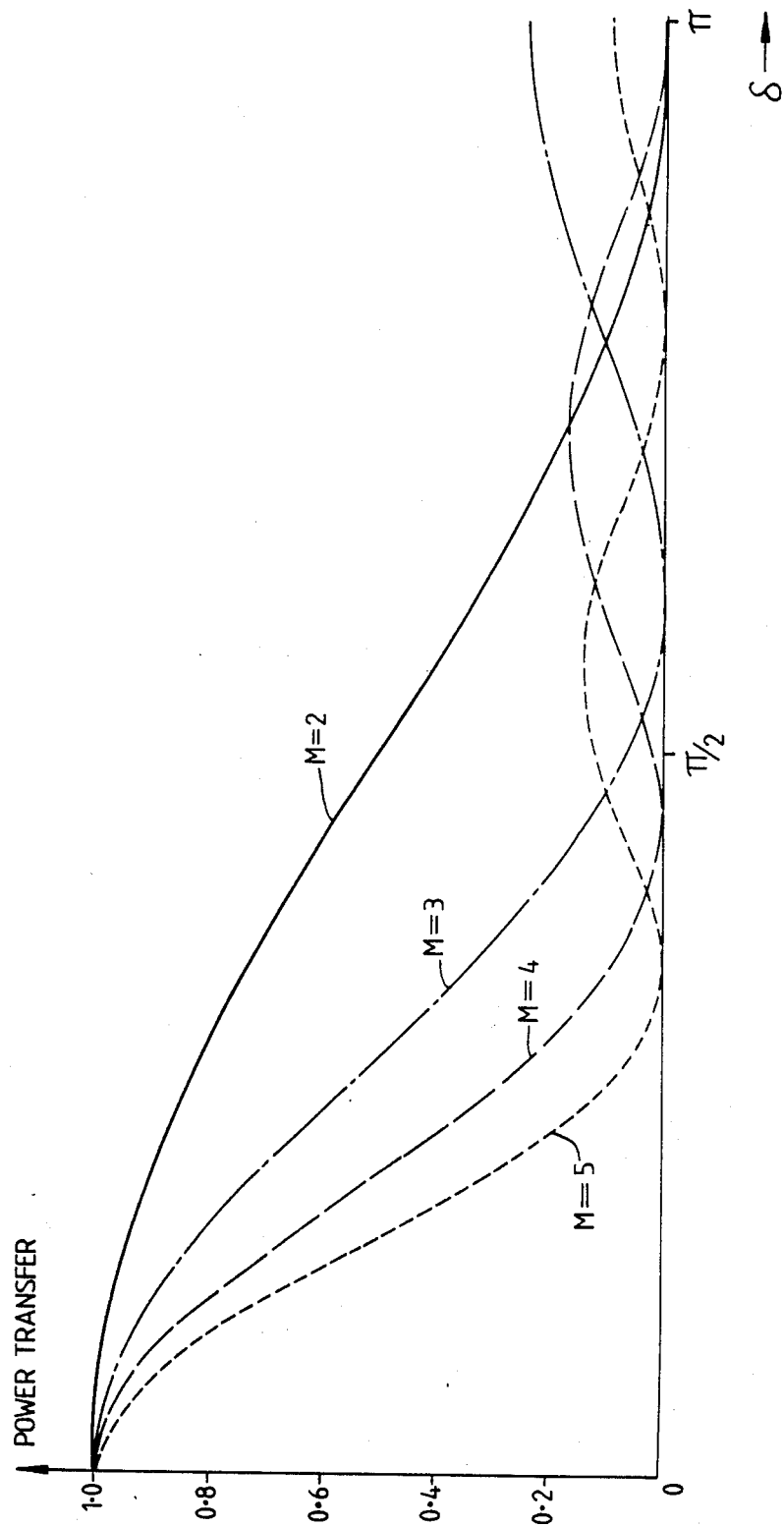
FIG. 2 is a graph depicting the effects, as a function of phase angle, provided by introducing up to 4 decoupled regions into the coupler.

The value of $\delta$ is wavelength dependent, and the number and length of the coupling regions is chosen so that, for some wavelength value for which $\delta$ is zero, the aggregate effect of the coupling regions is to transfer power from one waveguide to the other. This is the situation depicted at the left hand edge of FIG. 2. If now the wavelength is changed to produce a value of $\delta$ lying between zero and $2\pi$ the transfer of power is either incomplete or non-existent. Thus for a coupler with only two coupling sections there is no transfer of power when $\delta = \pi$. The graph is symmetrical about the $\delta = \pi$ line, and hence it is seen that for a coupler with three coupling regions there are two values of for which no transfer of power occurs, and that for the general case of a coupler with M coupling sections there are (M−1) values of $\delta$ for which no power transfer occurs. The smallest value of $\delta$ for which no power transfer occurs is reduced as the value of M increases. Remembering that the graph of FIG. 2 is periodic in form, it is seen that a coupler with several sections begins to take on the form of a comb-filter as depicted in FIG. 3. From FIG. 3 it has been seen that the width $\delta\lambda$ of a tooth of this comb is reduced by increasing the number, M, of sections of the coupler. The teeth of the comb are spaced in wavelength by the amount providing a phase increment of $2\pi$ in the optical path difference of a decoupled region. $\Delta\lambda \approx \delta\lambda$. Therefore, the width $\delta\lambda$ of an individual pass band of the coupler is enhanced by increasing the number of sections, and also by increasing the optical path difference introduced by a single decoupled section. Increasing the optical path difference will have the ancillary effect of decreasing the wavelength spacing between the comb teeth.

Referring now to FIG. 4, a slab waveguide coupler according to the invention may be constructed in semiconductive material lattice matched with indium phosphide. This coupler is designed for operation in the wavelength region of 1.3 microns. A substrate 40 of InP (refractive index ~3.209) is provided with 0.6 micron thick epitaxially grown layer 41 of InGaAsP whose composition is chosen to have a refractive index of about 3.296. (The composition of quaternary material lattice matched with indium phosphide is frequently referred to in terms of its emission wavelength. The material of layer 41 has an emission wavelength of 1.03 microns.) Layer 41 is covered with a further layer 42 of InP. The substrate 40 and two epitaxial layers 41 and 42 co-operate to form a first optical waveguide. Layer 42 is 1 micron thick, but shallow troughs 43 about 0.07 microns thick extending the full width of the device are selectively etched in its upper surface before the growth of a further epitaxial layer 44. Layer 44 is a layer of InGaAsP, but its composition is not the same as that of layer 41. This is in order to provide the second guide of the coupler, of which this layer provides the optical core, with propagation constants significantly different from those of the first guide so as to realise the requisite optical path difference in the decoupled sections. The refractive index of layer 44 is chosen to be 3.463 (emission wavelength 1.28 microns), and its thickness is chosen to be 0.28 microns. Substantially the same layer thickness is required over the troughs 43 as is present over the intervening regions 45. This layer is then itself covered with a further epitaxially grown layer 46 of indium phosphide 0.2 microns thick. This layer is then selectively etched to expose, over the full width of the device, the surface of layer 44 in the regions registering with the regions 45 lying between the troughs 43.

The quoted dimensions have been chosen to provide the two waveguides with matching propagating characteristics over the regions from where the layer 46 has been removed to leave the optical core of the upper waveguide bounded on its upper side by air. These regions are each a distance $L_1$ long, and are interspersed with decoupled regions that are each a distance $L_2$ long. In the decoupled regions the refractive index of the cladding is the same on both sides of the optical core 44 of the second waveguide, and hence the distribution of optical energy propagating in this second waveguide is substantially symmetrically distributed about the centre of the core. This contrasts with the situation in the coupled regions. Here the refractive index of the optical cladding (air) above the optical core of the second waveguide (layer 44) is substantially different from that of the optical cladding (InP) beneath that core. As a result the energy distribution is slightly displaced towards the side with the higher refracrive index cladding. The stepped profile of the upper surface of layer 42 has been designed to compensate for this effect and bring the energy profile of light propagating in the second waveguide in the coupling regions into alignment with that propagating in this guide in the decoupled regions. It is calculated that a single transfer of power from one waveguide to the other is, with these dimensions, provided by an aggregate coupling length of about 100 microns for light of a wavelength of about 1.3 microns. Therefore, since there are M coupling regions, the length of $L_1$ is 100/M microns. The coupling is dependent upon the thickness of layer 42 separating the two cores, and if this is enlarged then the required aggregate coupling length will also be enlarged. The wavelength spacing $\Delta\lambda$ between the comb teeth is inversely proportional to the distance $L_2$, and hence there is a constant of proportionality k such that $k = L_2 \Delta\lambda$. With these dimensions the difference in propagation constants is such that the value of k is calculated to be about $1.8 \times 10^{-5}$. Thus for instance, in order to provide a comb tooth width $\delta\lambda$ of 10 nm it is calculated that the length of $L_2$ must satisfy the relationship $L_2 = 1.8/M$ mm.

FIG. 4 shows the coupler as having straight sides but in an alternative version (not illustrated) the substrate 40 and layer 41 extend wider than layers 42, 44 and 46. These three narrower layers 42, 44 and 46 thus form a dielectric rib overlying layer 41, and thus provide a lateral waveguiding effect for the lower waveguide. The change of configuration will slightly perturb the propagation constants of the lower guide since its sides are bounded by material of higher refractive index than before, and hence a consequential small change in dimensions is required to restore the requisite matching between the propagation constants of the upper and lower guides.

Figure 5:
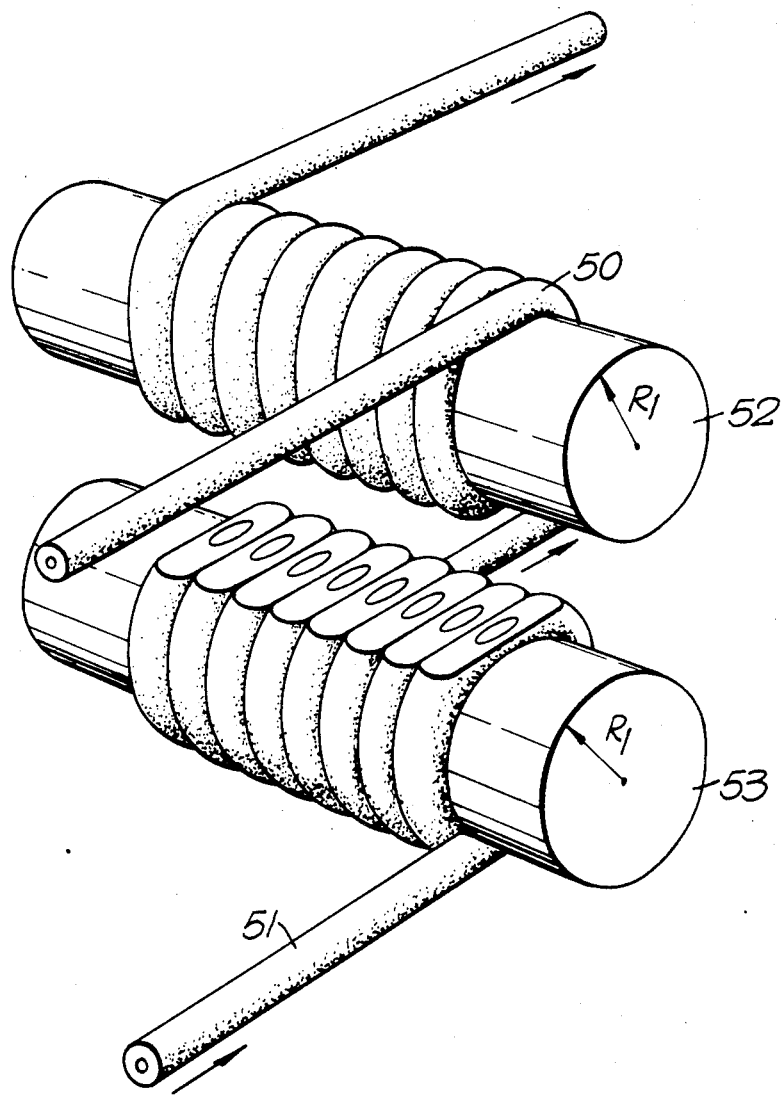
FIG. 5 is an exploded perspective representation of an alternative form of coupler.

A further alternative form of coupler, which is based on optical fibre waveguides, is depicted in FIG. 5. Here $(M-1)$ turns of two optical fibres 50 and 51 having matching propagation constants are wound in opposite senses on two mandrels 52 and 53 of slightly different radius so that the optical path distance of one turn of fibre 50 around mandrel 52 of radius $R_1$, is not exactly equal to that of one turn of fibre 51 around mandrel 53 of radius $R_2$.

With this arrangement the two waveguides are decoupled in the decoupled regions primarily by virtue of their physical separation, and these regions are provided by the regions where fibre 50 is not in contact with fibre 51. Correspondingly, the coupling regions are provided by the regions where they are in contact with each other. If entirely conventional optical fibres are employed, the cladding is so thick that merely bringing the two fibres into side-by-side contact is not of itself sufficient to effect any coupling between them. Under these circumstances it is necessary to remove some of the cladding in the contact region in order to allow the closer approach of the optical cores. Clearly the strength of coupling between the two fibres is critically dependent upon the precise value of the thickness of the cladding that is left, and since the choice of the appropriate length of each coupling region depends upon the coupling strength, it may be generally preferable to adopt a special optical fibre profile that does not require the removal of much if any of the cladding. One such profile is the assymetric profile depicted in FIG. 6. Here the fibre is of generally rectangular cross-section with a core 60 bounded on three sides by relatively thick cladding 61, but a very much thinner layer of this cladding on the fourth side 62. A rectangular (or square) cross-section has been chosen to facilitate the wrapping of this fibre around a mandrel such that the side 62 with the thin cladding faces outwardly at all points around the mandrel. In the directions of thick cladding, the cladding is thick enough for the evanescent field of the core mode to decay substantially to zero within the thickness of the cladding, and hence there is no coupling of power between adjacent turns on the mandrel, nor is there any coupling of power into the mandrel itself. In the direction of thin cladding, the cladding is thin enough for optical coupling of the required strength to occur between the cores of two such fibres arranged side-by-side with abutting thin claddings.

One of the features of the optical fibre waveguide version of coupler is that it can be made readily turnable by using a magnetostrictive or electrostrictive mandrel upon which to wind one of the fibres.

What is claimed is:

1. A wavelength selective optical waveguide coupler in which first and second single mode optical waveguides are provided with a set of identical coupling regions interspersed with a set of identical decoupled regions, wherein in each of the coupling regions the waveguides are dimensioned to provide matching propagation constants and extend alongside each other in sufficiently close proximity for their evanescent fields to overlap to the extent necessary to produce the required optical coupling, wherein in each of the decoupled regions the two waveguides have different optical path lengths, and wherein the aggregate length of the coupling regions is such that, for at least one wavelength for which the optical path difference of each of the intervening decoupled regions produces a relative phase shift between the two waveguides of an integral number of $2\pi$ radians, the coupling regions co-operate to provide a substantially complete transfer of optical power from either one of the waveguides to the other.

2. A coupler as claimed in claim 1, wherein in each of the decoupled regions the two waveguides are dimensioned to provide mismatched propagation constants.

3. A coupler as claimed in claim 2, wherein the waveguides are slab waveguides.

4. A coupler as claimed in claim 1, wherein in each of the decoupled regions the two waveguides are decoupled by virtue of the magnitude of the separation between their optical cores.

5. A coupler as claimed in claim 4, wherein the waveguides are fibre waveguides.

6. A coupler as claimed in claim 5, wherein the waveguides are wrapped in coils in opposite senses around two mandrels of different girth.

7. A coupler as claimed in claim 6, wherein each waveguide mandrel is provided with a flat facing a corresponding flat in the other waveguide mandrel.

8. A coupler as claimed in claim 6, wherein one of the waveguide mandrels is magnetostrictive or electrostrictive.

9. A coupler as claimed in claim 6, wherein each fibre waveguide is provided with an asymmetric arrangement of core and cladding and the fibres are disposed such that in the coupling regions the core of each fibre waveguide is closer to the outer surface of its cladding on the side facing the other fibre waveguide than on other sides.

10. A coupler as claimed in claim 9, wherein one of the waveguide mandrels is magnetostrictive or electrostrictive.

11. A coupler as claimed in claim 2, wherein the optical axes of the two waveguides have a substantially constant separation throughout the coupler.

12. A coupler as claimed in claim 11, wherein the optical axes of the two waveguides are substantially straight throughout the coupler.

* * * * *